US012276139B2

(12) United States Patent
Janssen et al.

(10) Patent No.: US 12,276,139 B2
(45) Date of Patent: Apr. 15, 2025

(54) LOCKING DEVICE

(71) Applicant: WITTE Automotive GmbH, Velbert (DE)

(72) Inventors: Thorsten Janssen, Velbert (DE); Dirk Janssen, Bergisch Gladbach (DE); Heinz-Joachim Klein, Haan (DE)

(73) Assignee: Witte Automotive GmbH, Velbert (DE)

( * ) Notice: Subject to any disclaimer, the term of this patent is extended or adjusted under 35 U.S.C. 154(b) by 0 days.

(21) Appl. No.: 17/644,136

(22) Filed: Dec. 14, 2021

(65) Prior Publication Data

US 2022/0186531 A1 Jun. 16, 2022

(30) Foreign Application Priority Data

Dec. 15, 2020 (DE) ..................... 10 2020 215 931.9

(51) Int. Cl.

| | |
|---|---|
| ***E05B 81/16*** | (2014.01) |
| ***E05B 81/14*** | (2014.01) |
| ***E05B 81/20*** | (2014.01) |
| *E05B 85/26* | (2014.01) |

(52) U.S. Cl.

CPC .............. *E05B 81/16* (2013.01); *E05B 81/14* (2013.01); *E05B 81/20* (2013.01); *E05B 85/26* (2013.01); *E05Y 2900/50* (2013.01)

(58) Field of Classification Search

CPC .......... E05B 81/16; E05B 81/14; E05B 81/20; E05B 85/26; E05Y 2900/50

See application file for complete search history.

(56) References Cited

U.S. PATENT DOCUMENTS

| | | | | |
|---|---|---|---|---|
| 2004/0174021 A1* | 9/2004 | Tensing | .................. | E05B 81/68 292/216 |
| 2006/0012186 A1* | 1/2006 | Zillert | ..................... | E05B 81/20 292/216 |
| 2007/0205613 A1* | 9/2007 | Berghahn | ................ | E05B 81/20 292/216 |

(Continued)

FOREIGN PATENT DOCUMENTS

| | | | | |
|---|---|---|---|---|
| CN | 110159105 A * | 8/2019 | ............. | E05B 77/36 |
| DE | 102005048564 A1 * | 4/2007 | ............. | E05B 81/14 |

(Continued)

OTHER PUBLICATIONS

European Patent Office, Extended Search Report in Application No. EP21214771, dated Mar. 13, 2022, 8 pages.

(Continued)

*Primary Examiner* — Kristina R Fulton
*Assistant Examiner* — James Edward Ignaczewski
(74) *Attorney, Agent, or Firm* — Marshall & Melhorn, LLC

(57) ABSTRACT

A locking device for a movable vehicle element of a vehicle may have at least a rotary catch, a locking element and an associated blocking mechanism. The blocking mechanism may have at least one blocking element and a movable actuating element for locked coupling of the rotary catch and the locking element. The movable actuating element may be designed to move the rotary catch into a closed position going beyond at least one latching position and to stop in this closed position. The rotary catch and the blocking element may be out of latching engagement in the closed position.

13 Claims, 6 Drawing Sheets

(56) References Cited

U.S. PATENT DOCUMENTS

| | | | | |
|---|---|---|---|---|
| 2016/0244999 | A1* | 8/2016 | Ottino | E05B 85/26 |
| 2016/0245000 | A1* | 8/2016 | Ottino | E05B 81/18 |
| 2019/0301212 | A1* | 10/2019 | Digel | E05B 81/14 |
| 2020/0362599 | A1* | 11/2020 | Rosales | E05B 81/04 |
| 2020/0362600 | A1* | 11/2020 | Rosales | E05B 81/20 |

FOREIGN PATENT DOCUMENTS

| | | | | | |
|---|---|---|---|---|---|
| DE | 102007057560 | A1 | | 6/2009 | |
| DE | 102016002148 | A1 | | 8/2016 | |
| DE | 102018113270 | A1 | | 12/2019 | |
| EP | 1489252 | A2 | * | 12/2004 | E05B 81/20 |
| JP | 2017087902 | A | * | 5/2017 | |
| WO | 2013057590 | A2 | | 4/2013 | |

OTHER PUBLICATIONS

German Patent and Trademark Office, Office Action in Application No. 102020215931.9, dated Oct. 5, 2021, 7 pages, Munich Germany.

China National Intellectual Property Administration, Chinese Office Action in Application No. 202111530393.3, dated Dec. 5, 2022, 13 pages.

* cited by examiner

LOCKING DEVICE

FIELD

The invention relates to a locking device, in particular for a movable vehicle element of a vehicle.

BACKGROUND

Locking devices, in particular locks or ratchets, which are used, for example, in motor vehicles for locking backrests, doors, hoods, tailgates, trunk lids or the like are known from the prior art. To unlock the lock, a ratchet formed from a blocking pawl, a rotary catch and a locking element, in particular in the form of a locking bar or locking bolt, is set into motion by means of a motor in order to adjust the blocking pawl from a blocking position into an unlocked position. In the unlocked position of the blocking pawl, the rotary catch is released so that it can be opened from a closed position into an open position. For example, the rotary catch can be moved beyond a main latching position so that the blocking pawl can fall into a latching recess in the rotary catch.

Conventional locking devices, in particular having shutting functions, have comparatively high sealing pressures. If the sealing pressure is high, what is known as an opening bang occurs when the locking device is opened, which happens, for example, because loading, in particular preloading, is built up on the associated movable vehicle element during a locking process. For example, the tension is generated by a compressible sealing element, in particular a door sealing element, arranged on the movable vehicle element and/or on a vehicle opening. In the conventional closed position in which a main latch of the rotary catch abuts the blocking pawl, this preloading still remains, which is then suddenly released when the blocking pawl is separated from the rotary catch and causes an acoustically perceptible opening bang. For example, preloading arises on the sealing element and thus on the movable vehicle element if the sealing element is compressed too much during the closing process. Such a compression takes place, for example, in that, during a closing process, the rotary catch is moved beyond the main latching position to then abut a latching lug of the blocking pawl in order to latch the rotary catch to the blocking pawl. The rotary catch can also be preloaded in the opening direction. Due to preloading of the rotary catch, there is, for example, a latching engagement between the rotary catch and the blocking element with a corresponding preloading load. As a result, for example, comparatively high frictional forces arise between the rotary catch and the blocking element which must be overcome during an opening process in order to unlatch the blocking element and/or the rotary catch. When the blocking element and/or the rotary catch are unlatched, a sudden, i.e., unexpected, relaxation takes place between the aforementioned preloaded parts of the vehicle and/or the locking device and an opening bang occurs.

For example, in known shutting lock systems, the rotary catch is supported during a closing process between the pre-latching position and the main latching and end position, with the sealing pressure building up already when the rotary catch is moved from the pre-latching position into the main latching position.

SUMMARY

The problem addressed by the invention is that of providing an improved locking device which, for example, prevents an acoustically perceptible, unpleasant and undesired opening noise, in particular what is referred to as an opening bang, during an opening process.

The problem is solved according to the invention by a locking device having the features of the claims.

The dependent claims relate to advantageous embodiments of the invention.

The locking device according to the invention, in particular for a movable vehicle element of a motor vehicle, comprises at least a rotary catch, a locking element and an associated blocking mechanism. The blocking mechanism comprises at least one blocking element and a movable actuating element for locked coupling of the rotary catch and the locking element, wherein the movable actuating element is designed to move the rotary catch into a closed position going beyond at least one latching position and to stop in this closed position. In the closed position, the rotary catch and the blocking element are out of latching engagement. Furthermore, the rotary catch and the locking element are coupled to one another so as to be fully locked in the closed position.

In other words: the actuating element is designed to fulfill two functions. For example, the actuating element is what is referred to as a shutting aid. For example, the actuating element is designed as a shutting pawl or shutting lever. The actuating element also has the properties of a blocking element, for example a blocking pawl or a blocking lever. One function is to move the rotary catch into the closed position, in particular to adjust it, for example to pivot or rotate it. Another function is to stop and/or block the rotary catch in the closed position. For example, a movement of the rotary catch back in the direction of the open position is blocked by the actuating element. In particular, the rotary catch is coupled to the actuating element in the closed position in such a way that the rotary catch rests at least in portions on the actuating element and is thereby held by it, in particular held in a stopping and/or blocking manner. The actuating element is fixed in position in the closed position such that further rotary movement of the rotary catch in the direction of the open position is blocked. For example, the actuating element is designed to hold the rotary catch in the closed position in a self-locking manner. The actuating element presses against the rotary catch in the closed position. The rotary catch is held on the actuating element in a clamping manner, for example.

The advantages achieved by the invention are that both a closing process and an opening process can be carried out with comparatively little noise or even noiselessly. In particular, the closing device is designed to at least reduce or even prevent an opening noise, in particular an opening bang, during an opening process of the movable vehicle element. The locking device is also designed to hold as low a sealing pressure as possible on the movable vehicle element and/or in the locking device in the closed position until the next opening process.

In order to eliminate this opening bang, the rotary catch is first moved into the at least one latching position and, after reaching the latching position, into a defined overtravel during the closing process. The rotary catch is then stopped in an overtravel position corresponding to the overtravel by means of the actuating element. This sequence allows a comparatively slow and delayed compression of the sealing element. The locking device is additionally set in such a way that a sealing pressure is only applied by moving the rotary catch out of the latching position, for example what is referred to as the main latching position. This means that at least the locking device is substantially free of load in the latching position, for example in the main latching position. While the vehicle is in motion, the rotary catch remains in the stopped closed position.

When an opening process is initiated, the rotary catch is reversed in a controlled manner by means of the actuating element. In this case, the actuating element is designed to move the rotary catch out of the closed position back into the at least one latching position, for example into the main latching position, in a substantially defined manner. The rotary catch can then be decoupled, in particular unlatched, from the blocking element. For example, the blocking element is designed to release the rotary catch from the latching position, for example the main latching position, into the open position. In the open position of the locking device in which the rotary catch and the locking element are out of engagement, the actuating element and the rotary catch are also out of engagement. In a development of the locking device, the blocking element can be unlocked at the same time as the reversing process of the rotary catch. As a result, there is not a point in time during the opening process when there is a sudden release of a sealing force and the opening bang is thus prevented.

In a development, it is not absolutely necessary, during an opening process, to assume the latching position, for example the main latching position, after the closed position. The blocking element is designed for example, to release the rotary catch directly from the closed position when an opening process is initiated. The blocking element is designed to be pivotable about an axis of rotation, for example. Because the rotary catch is not in latching engagement with the blocking element in the closed position, producing an opening noise can be prevented. For example, opening noises arise, in particular in the form of a perceptible bang, as a result of the friction produced due to the latching engagement between the rotary catch and the blocking element. In other words: during the opening process, the rotary catch does not have to be moved back into a latching position in order to then be released into the open position. The blocking element is pivoted in the direction away from the rotary catch before the rotary catch can reach the latching position provided for the locking process.

Furthermore, the above-mentioned advantages are achieved by a locking device, in particular in the form of a lock, which is designed with comparatively fewer parts, and has a reduced weight and reduced costs. In addition, the locking device is designed to be easy to assemble. Additionally, the locking device according to the invention requires comparatively little space and offers a simple solution for eliminating opening noises. A vehicle to be manufactured or already manufactured and/or used can easily be upgraded with such a locking device.

For example, the locking device comprises shutting kinematics or a shutting mechanism.

The locking device is, for example, a lock. As a ratchet, the lock comprises, for example, the at least one rotary catch and the blocking mechanism which, for example, engage with one another in a latching manner and the blocking mechanism blocks the opening of the rotary catch that has fallen into a locking element, for example a locking bar or locking bolt. Depending on the design, the lock comprises a manual or motorized drive mechanism for opening the blocking mechanism and for decoupling the rotary catch from the locking element. The locking element is, for example, fixed to the vehicle. For example, the locking element is arranged in a vehicle opening, for example a vehicle door opening, trunk lid opening or engine hood opening. A ratchet consisting of a rotary catch and a blocking mechanism is arranged, for example, on the movable vehicle element.

The movable vehicle element can be adjusted fully automatically and by motor from the open position into the latching position and then into the closed position. The movable vehicle element can also be partly manually moved into the latching position, for example by slamming the movable vehicle element. The shutting kinematics or shutting mechanism can then be activated and engage in order to support an adjustment of the rotary catch from the latching position into the closed position and thus the driving position. The actuating element is designed to carry out this supporting adjustment and to stop and/or block, in particular to lock, the rotary catch in the closed and driving position. For example, the actuating element stops the rotary catch in the closed position by means of latching engagement, for example frictional engagement. For example, the actuating element blocks the rotary catch in the closed position by means of fixing the actuating element in a locked position in which a movement path of the rotary catch in the direction of the open position is blocked. For example, the movable actuating element can be driven by a motor. The actuating element can be actuated, for example, by means of a control initiated via a microswitch. For example, electronic devices already present in the vehicle can be used to control the actuating element.

The axes of rotation of the blocking element, the rotary catch and the actuating element are, in particular, arranged so as to be offset from one another.

In a further embodiment, the actuating element has at least one actuating contour directed in the direction of the rotary catch for initiating a movement of the rotary catch from the at least one latching position into the closed position.

In a further embodiment, the actuating element has at least one stop contour directed in the direction of the rotary catch for stopping the rotary catch in the closed position until an opening process. It should be understood that the stop contour can also be referred to as a blocking contour.

In a further embodiment, the actuating contour and the stop contour are designed as a substantially continuously extending outer contour on the actuating element. The actuating element comprises, for example, at least one bulge directed in the direction of the rotary catch. For example, the bulge is arranged at one end of the actuating element. A different end of the actuating element is mounted on an axis of rotation associated therewith.

In a further embodiment, the actuating element is designed to be pivotable about an axis of rotation between the open position and the closed position.

In a further embodiment, the rotary catch comprises at least one latching element corresponding to a counter latching element of the blocking element. Furthermore, the rotary catch comprises at least one abutment element which is arranged on an opposite side to the latching element and can be actuated by the actuating element in order to adjust the rotary catch from the at least one latching position into the closed position. For example, the abutment element comes into contact with the actuating element as soon as the actuating element is activated in order to move, in particular to adjust, the rotary catch from the at least one latching position, for example the main latching position, into the closed position. In the closed position, the rotary catch is held stopped and/or supported on the actuating element.

In a further embodiment, the rotary catch has at least one abutment contour which is directed in the direction of the actuating element and comes into contact with the actuating contour thereof when actuated by the actuating element.

In a further embodiment, the rotary catch has at least one counter stop contour which is directed in the direction of the actuating element and is stopped on the actuating element in the closed position. A further rotary movement of the rotary catch in the direction of the open position is blocked, fixed and/or locked.

In particular, the abutment element comprises the abutment contour and the counter stop contour. In particular, the abutment contour comes into contact with the stop contour of the actuating element as soon as the actuating element is activated in order to move, in particular to adjust, the rotary catch from the at least one latching position, for example the main latching position, into the closed position. For example, the abutment element of the rotary catch has a substantially continuously extending outer contour which, for example, comprises the abutment contour and the counter stop contour. In a development, the rotary catch comprises at least one bulge directed in the direction of the actuating element. The abutment element and the rotary catch are, for example, made in one piece. Alternatively, the abutment element is a separate component which is connected to the rotary catch in an integral, frictional and/or form-fitting manner. The rotary catch and/or the abutment element is/are made of metal and/or plastics material.

In a further embodiment, the movable actuating element is designed to move the rotary catch from an open position into a main latching position in which the rotary catch is coupled so as to be locked to the locking element and is in latching engagement with the blocking element.

In a further embodiment, the movable actuating element is designed to move the rotary catch from an open position into a pre-latching position in which the rotary catch is coupled so as to be partly locked to the locking element and is latched on the blocking element, and is designed to move said rotary catch from the pre-latching position into a main latching position in which the rotary catch is coupled so as to be locked to the locking element and is in latching engagement with the blocking element, and is designed to move said rotary catch from this main latching position into the closed position and to stop and/or block said rotary catch in the closed position until an opening process. The pre-latching position can be achieved by manually slamming the movable vehicle element or by a completely automatic, i.e., motorized, adjustment. The vehicle element is, for example, a vehicle door, a tailgate or an engine hood of a motor vehicle or vehicle. In the pre-latching position, the rotary catch is coupled so as to be partly locked to the locking element and pre-latched on the blocking element. In the main latching position, the rotary catch is coupled so as to be locked to the locking element and latched on the blocking element.

In a further embodiment, the closed position defines an overtravel position which goes beyond the latching position and in which a latching element of the rotary catch is spaced apart from a counter latching element of the blocking element. This means that the blocking element and the rotary catch are out of latching engagement in the closed position. In particular, the latching element, for example a main latching element, the rotary catch and the counter latching element of the blocking element are out of latching engagement. As a result, there can be a comparatively long reversing path of the rotary catch without comparatively high friction and sealing forces occurring between the rotary catch and the blocking element that have to be overcome during an opening process. For example, the rotary catch comprises a pre-latching element which, in the pre-latching position, is in latching engagement with the counter latching element of the blocking element. Furthermore, the rotary catch comprises a main latching element which, in the main latching position, is in latching engagement with the counter latching element of the blocking element. The pre-latching element and the main latching element are arranged on the rotary catch, in particular on a side of the rotary catch directed toward the blocking element. For example, the pre-latching element and the main latching element are spaced apart from one another. The pre-latching element and the main latching element are each designed, for example, as latching lugs projecting from the rotary catch. For example, these latching elements are made of plastics material and/or are at least coated with plastics material.

The blocking element is designed, for example, as a blocking pawl. The blocking element is made, for example, from metal and/or plastics material. For example, at least the counter latching element is made of plastics material and/or provided with a plastics coating. The counter latching element is designed, for example, as a latching lug protruding from one side of the latching element.

In a further embodiment, the blocking mechanism comprises a shutting mechanism. For example, the actuating element is designed as a pawl, in particular a shutting pawl, or a lever, in particular a shutting lever.

DESCRIPTION OF THE FIGURES

Embodiments of the invention are explained in greater detail with reference to the drawings, in which.

DETAILED DESCRIPTION

Parts corresponding to one another are provided with the same reference signs in all figures.

Figure 1:
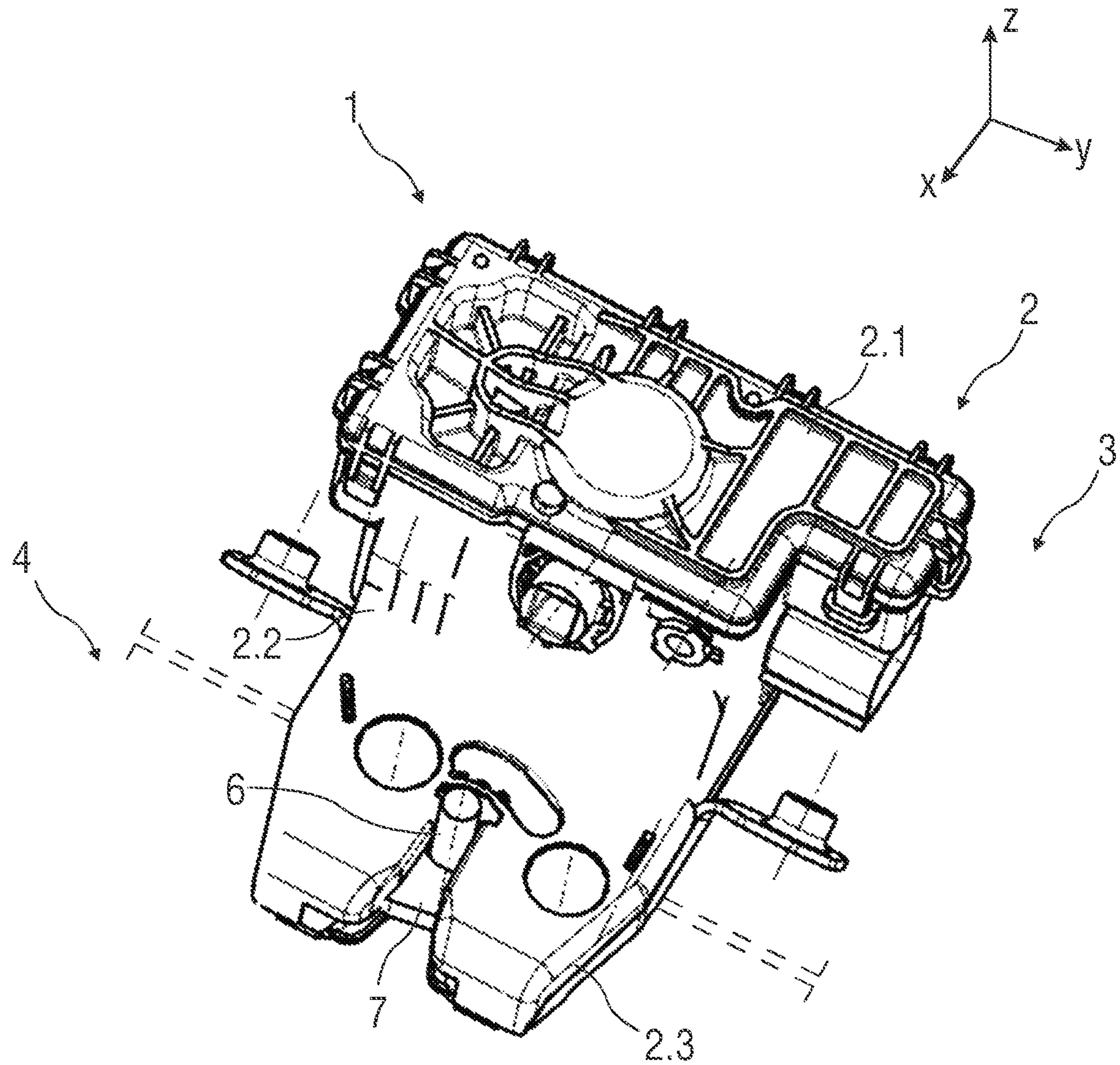
FIG. 1 schematically shows, in a perspective view, an embodiment of a locking device having a housing for a movable vehicle element of a vehicle, FIG. 2 schematically shows, in plan view, the locking device according to FIG. 1, comprising at least a rotary catch, a locking element and a blocking mechanism for locked coupling of the rotary catch and the locking element, FIG. 3A schematically shows, in plan view, an embodiment of a locking device for a movable vehicle element of a vehicle in an open position, FIG. 3B schematically shows, in a plan view, a sequence of movements of the locking device according to FIG. 3A from the open position into a closed position in which the rotary catch and the locking element are coupled so as to be completely locked to one another, FIG. 3C schematically shows, in a plan view, a sequence of movements of the locking device according to FIG. 3A from the open position into a closed position in which the rotary catch and the locking element are coupled so as to be completely locked to one another, FIG. 3D schematically shows, in a plan view, a sequence of movements of the locking device according to FIG. 3A from the open position into a closed position in which the rotary catch and the locking element are coupled so as to be completely locked to one another, FIG. 4 schematically shows an embodiment of an opening process of the locking device, which is moved from a closed position via a main latching position into an open position, and FIG. 5 schematically shows a further embodiment of an opening process of the locking device, which is moved from a closed position directly into an open position.

FIG. 1 schematically shows, in a perspective view, an embodiment of a locking device 1 having a housing 2 for a movable vehicle element 3 of a vehicle 4. The movable vehicle element 3 is, for example, a pivotable vehicle door, tailgate or engine hood arranged on the vehicle 4.

The housing 2 consists, for example, of a plurality of housing parts 2.1 to 2.3. For example, the housing 2 is designed as a housing box. For example, the housing parts 2.1 to 2.3 are attached to the vehicle element 3.

Figure 2:
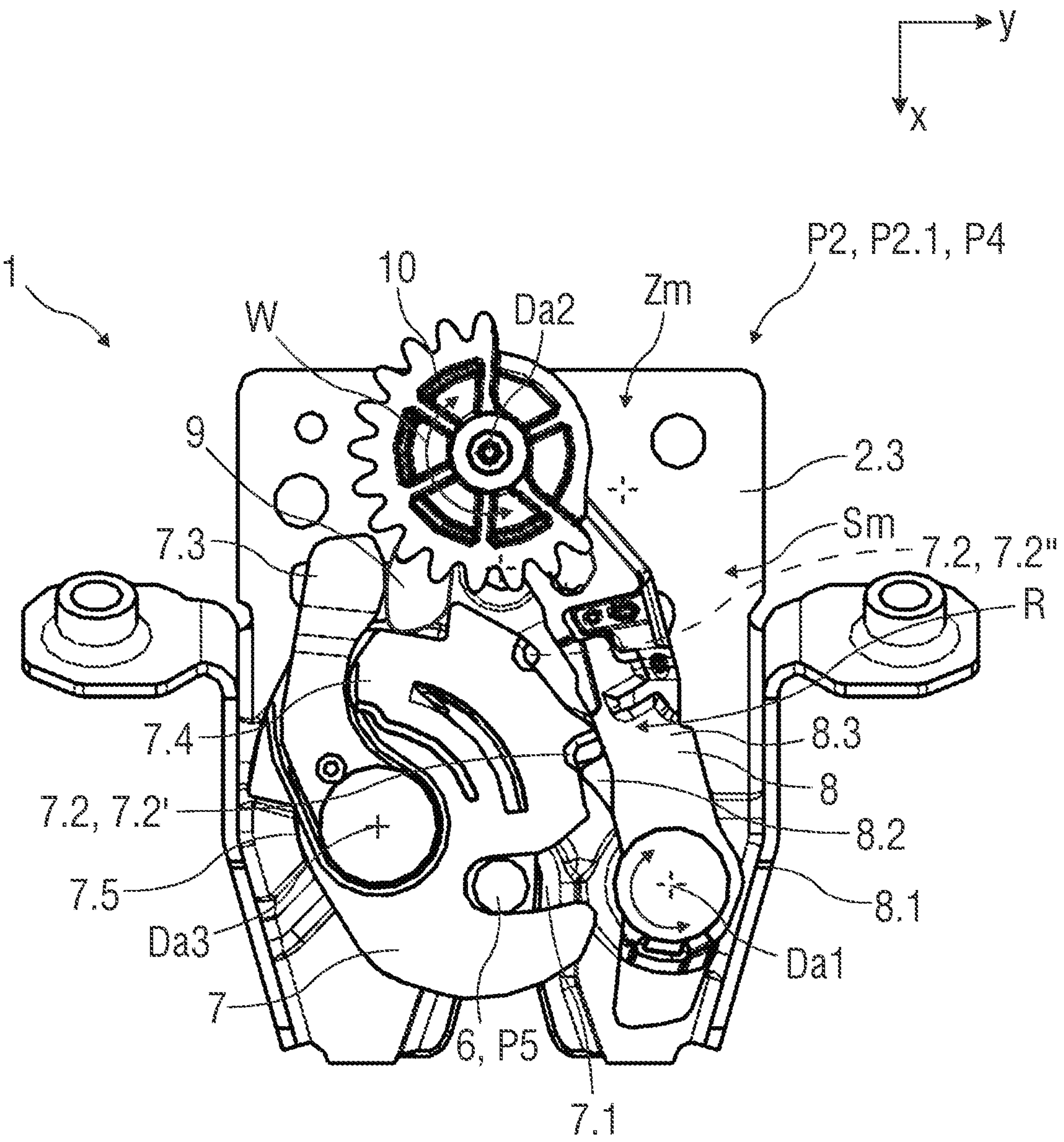

FIG. 2 schematically shows, in plan view, the locking device 1 according to FIG. 1 having hidden housing parts 2.1, 2.2. The housing part 2.3 is, for example, a carrier and/or base plate.

The locking device 1 is a lock system. The locking device 1 is, for example, a tailgate lock, in particular a driven tailgate system. The locking device 1 comprises a shutting mechanism Zm.

The housing 2 encloses a ratchet 5 of the locking device 1. The locking device 1 comprises, as a ratchet 5, at least one locking element 6, a rotary catch 7 and a blocking mechanism Sm. For example, the blocking mechanism Sm is a shutting mechanism Zm.

The blocking mechanism Sm comprises a blocking element 8. The blocking element 8 is designed, for example, as a blocking pawl. The blocking element 8 is made, for example, from metal and/or plastics material. The blocking element 8 is rotatably mounted on an axis of rotation Da1. For example, the housing part 2.3 comprises a bearing element (not shown in more detail) which forms the axis of rotation Da1 and on which the blocking element 8 is mounted so as to be rotatable, in particular pivotable. In the embodiment shown according to FIG. 2 and in plan view, a lower portion 8.1 of the blocking element 8 is connected to the axis of rotation Da1. The blocking element 8 comprises a counter latching element 8.2. The counter latching element 8.2 is arranged in a substantially central portion 8.3 of the blocking element 8. For example, the counter latching element 8.2 is made of plastics material and/or provided with a plastics coating. For example, the counter latching element 8.2 is encapsulated with a plastics material having damping properties. The counter latching element 8.2 is designed as a latching lug and protrudes in the direction of the rotary catch 7 from a side of the counter latching element 8.2 facing the rotary catch 7.

The blocking mechanism Sm further comprises a movable actuating element 9. The actuating element 9 is, for example, a blocking and/or shutting pawl for locked coupling of the rotary catch 7 and the locking element 6. The actuating element 9 is designed to fix the rotary catch 7 in a final closed position P1, which is maintained during driving, until the next opening process O1, O2. For example , FIGS. 4 and 5 each show an opening process O1, O2. For example, FIG. 2 shows a latching position P2 which can be assumed before the closed position P1, in particular what is referred to as a main latching position P2.1, of the rotary catch 7 and FIG. 3D shows the closed position P1. The main latching position P2.1 is, for example, the only latching position P2 that the locking device 1 has. For example, a pre-latching position P2.2 as shown in FIG. 3B is not absolutely necessary. For example, the locking device 1 can be designed to have only one latching position P2, for example the main latching position P2.1. Optionally, and in addition, the locking device 1 can be designed to have two latching positions P2, for example, a pre-latching position P2.2 and a main latching position P2.1.

In an alternative embodiment, the embodiment shown in FIG. 2 can represent the locking device 1 in a main latching and closed position P4 in which the actuating element 9, in addition to the blocking element 8, stops, for example blocks and locks, the rotary catch 7 until an opening process O1, O2. As a result, the blocking element 8 is at least partly relieved and frictional and compressive forces on the counter latching element 8.2 are comparatively reduced. The rotary catch 7 is therefore secured twice in the main latching and closed position P4. This double securing prevents, for example, an unexpected, unintentional and/or forcible unlocking of the rotary catch 7, for example in the event of a crash or an attempted theft.

Figure 3A:
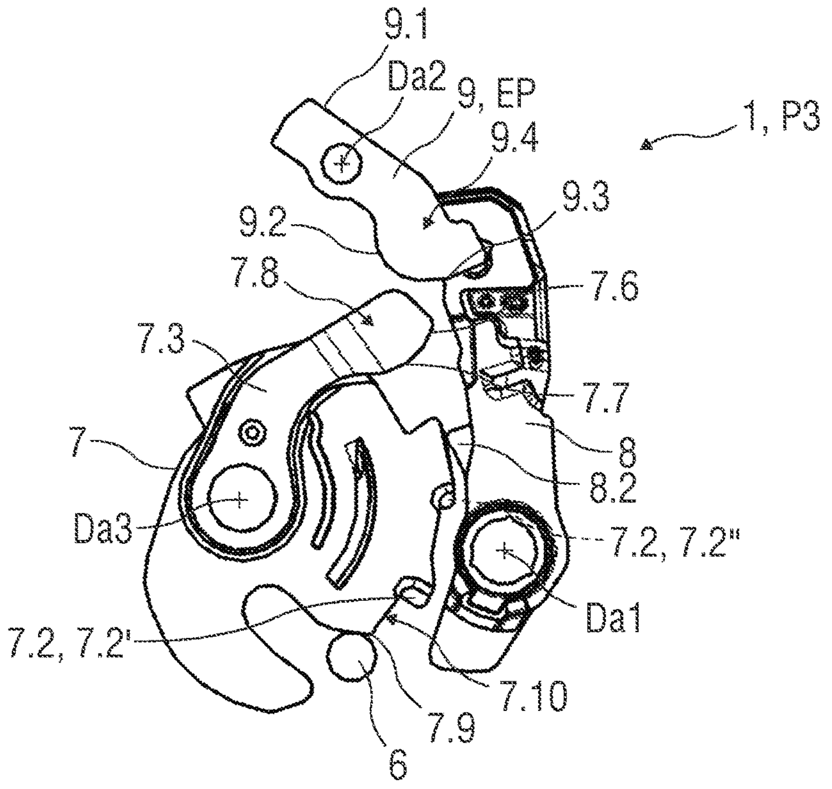
Figure 3B:
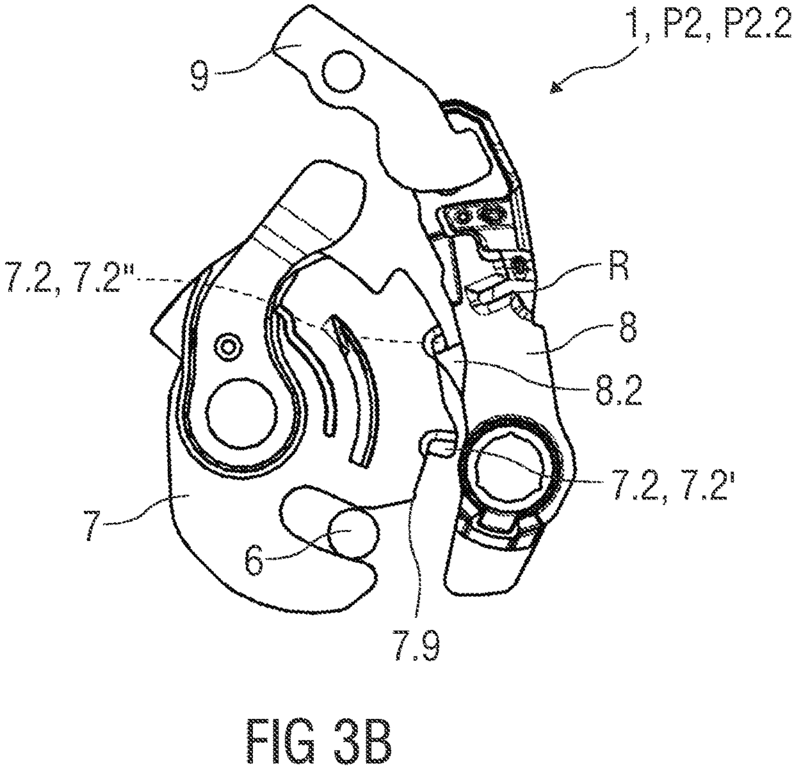
Figure 3C:
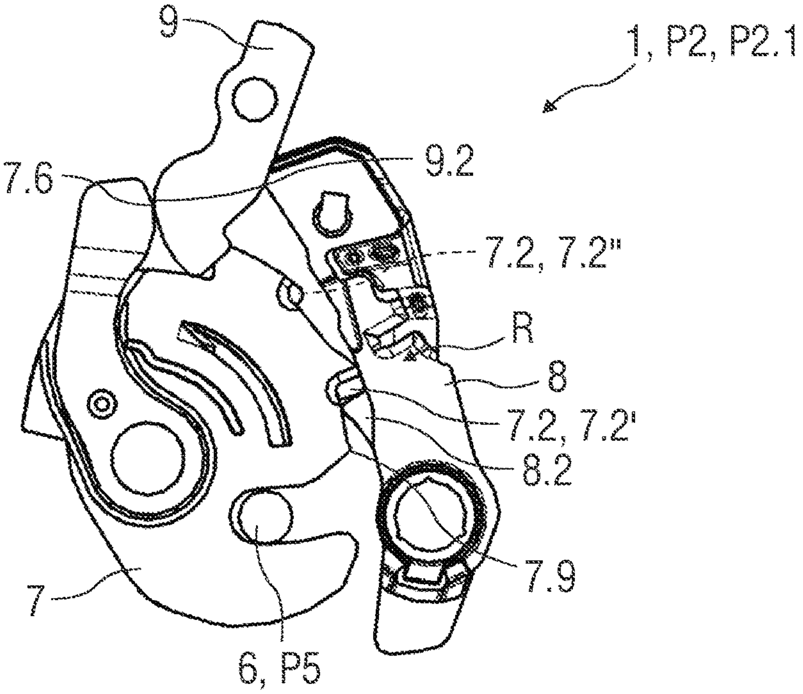
Figure 3D:
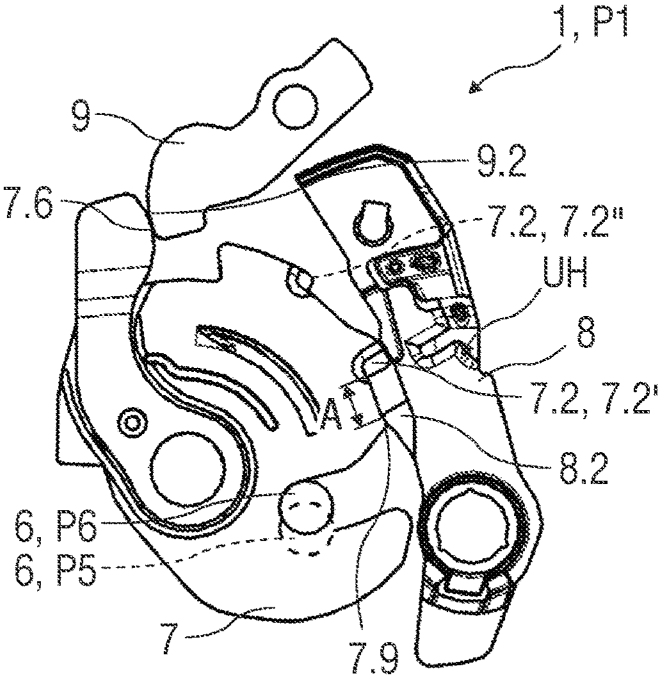

In particular, the movable actuating element 9 is designed to move, in particular to adjust and/or pivot, the rotary catch 7 from at least the shown latching position P2, in particular the main latching position P2.1, which can be assumed after an open position P3 shown in FIG. 3A, into the closed position P1 shown in FIG. 3D which goes beyond this latching position P2, and is designed to stop and/or block, in particular to lock, said rotary catch in this closed position P1. In the closed position P1, the rotary catch 7 and the blocking element 8 are out of latching engagement R. Furthermore, the rotary catch 7 and the locking element 6 are coupled so as to be fully locked to one another in the closed position P1. The closing element 6 is arranged in a receptacle 7.1 of the rotary catch 7. When the locking element 6 is moved from the latching position P2 shown in FIG. 2 or FIG. 3C into the closed position P1, said locking element is moved beyond a position P5 corresponding to the latching position P2 (here indicated by dashed lines) into a further position P6. In the positions P5 and P6, the locking element 6 is coupled so as to be fully locked to the rotary catch 7.

For example, the actuating element 9 is designed as a pawl, in particular a shutting pawl, or a lever, in particular a shutting lever. The actuating element 9 can be actuated by a motor, electromechanically or electrically, for example. The actuating element 9 is adjusted, for example, by means of a gear element 10 which is coupled thereto. The gear element 10 has, for example, at least partly circumferential toothed segments which, for example, are in latching engagement with a pinion (not shown in detail). The pinion is connected, for example, to a shaft of a motor unit (not shown in detail). To adjust the actuating element 9, the pinion and thus the gear element 10 are moved. When the actuating element 9 and the rotary catch 7 are in contact with one another, the rotary catch 7 is moved together with said actuating element, for example pressed in the direction of an adjustment path W of the actuating element 9. When the closed position P1 is reached, the motor unit stops and the actuating element 9 is fixed in a locking position VP, as shown in FIG. 3D, or alternatively in the main latching and closed position P2.1, P1. The actuating element 9 stops the rotary catch 7 in this closed position P1 or, alternatively, the main latching and closed position P4 and blocks the rotary catch 7, for example, against its pretensioning direction. For example, the rotary catch 7 is pretensioned in the direction of the open position P3 in order to support an opening process O1, O2.

The actuating element 9 is made, for example, from metal and/or plastics material. At least on one contact surface facing the rotary catch 7, the actuating element 9 is made of and/or encapsulated by, for example, a plastics material provided with damping properties. The actuating element 9 is a separate component. For example, the separate actuating element 9 is spaced apart from the rotary catch 7. Only the contact surface of the actuating element 9 comes into contact with the rotary catch 7 when the rotary catch 7 is adjusted and stopped and/or blocked. For example, the separate actuating element 9 is substantially decoupled and/or can be substantially decoupled from the rotary catch 7. The actuating element 9 can be activated, for example, independently of a movement of the rotary catch 7. In the embodiment shown according to FIG. 2, the actuating element 9 is arranged substantially above the rotary catch 7 and the blocking element 8 and is rotatably mounted on the housing part 2.3. For example, the housing part 2.3 comprises a bearing element (not shown in more detail) which forms the axis of rotation Da2 and on which the movable and separate actuating element 9 is rotatably, i.e., pivotally, mounted. The axis of rotation Da2 is arranged in a substantially central or upper portion 9.1 of the actuating element 9, as shown, for example, in FIG. 3A to 3D.

The pivotable actuating element 9 is designed in particular to move the rotary catch 7 from the main latching position P2.1, in which the rotary catch 7 is coupled so as to be locked to the locking element 6 and is in latching engagement R with the blocking element 8, into the closed position, which goes beyond the main latching position P2.1 P1, and to stop in this closed position P1, wherein in the closed position P1, as shown in FIG. 3D, the rotary catch 7 and the blocking element 8 are out of latching engagement R.

For example, the rotary catch 7 comprises a latching element 7.2, for example a main latching element 7.2', which is in latching engagement R with the counter latching element 8.2 of the blocking element 8 in the main latching position P2.1. The main latching element 7.2' protrudes from a side of the rotary catch 7 facing the blocking element 8. For example, the main latching element 7.2' is designed as a latching lug and is made of plastics material and/or is at least encapsulated with a plastics material having damping properties.

The rotary catch 7 also comprises an abutment element 7.3. The abutment element 7.3 protrudes substantially from a base body 7.4 of the rotary catch 7 in the direction of the actuating element 9. The abutment element 7.3 and the rotary catch 7 and its base body 7.4 are formed from one part, for example. Alternatively, the rotary catch 7 is constructed in several parts, wherein the abutment element 7.3 is connected, as a separate component, to the base body 7.4 in an integral, frictional and/or form-fitting manner. The abutment element 7.3 can be designed, for example, in the form of a further latching lug. The abutment element 7.3 has a contact surface which comes into contact with a contact surface of the actuating element 9 when the actuating element 9 adjusts and stops the rotary catch 7.

The rotary catch 7 is rotatably mounted on an axis of rotation Da3. For example, the housing part 2.3 comprises a bearing element (not shown in detail) which forms the axis of rotation Da3 and on which the rotary catch 7 is rotatably, in particular pivotally, mounted. The axis of rotation Da3 is arranged, for example, in a substantially central portion 7.5 of the rotary catch 7.

The axes of rotation Da1 to Da3 are in particular offset from one another.

FIG. 3A to 3D each show, in plan view, a sequence of movements of the locking device 1 from the open position P3 into the closed position P1.

In particular, FIG. 3A shows a schematic plan view of the locking device 1 in the open position P3 in which the rotary catch 7 releases the locking element 6 and the movable vehicle element 3 can be opened. In the open position P3, the actuating element 9 is in an unlocked position EP which is adjusted with respect to the locking position VP.

FIG. 3B shows a schematic plan view of the locking device 1 in an optionally additional first latching position P2, in particular a pre-latching position P2.2, which can be assumed during a locking process after the open position P3 and in which the rotary catch 7 already engages around the locking element 6.

FIG. 3C shows a schematic plan view of the locking device 1 in the second latching position P2, in particular the main latching position P2.1, which is assumed after the pre-latching position P2.2 and in which the rotary catch 7 and the locking element 6 are coupled so as to be locked to one another.

FIG. 3D shows a schematic plan view of the locking device 1 in the final closed position P1 which is assumed after the main latching position P2.1 and in which the rotary catch 7 is stopped and blocked by the actuating element 9, wherein the rotary catch 7 and the blocking element 8 are out of latching engagement.

The movable actuating element 9 is designed in particular to actively move the rotary catch 7 from the pre-latching position P2.2 assumed after the open position P3 into the main latching position P2.1 and from this main latching position P2.1 into the closed position P1. If the locking device 1 only has the main latching position P2.1, the actuating element 9 is designed to move the rotary catch 7 from the open position P3 into the main latching position P2.1. In the closed position P1, the actuating element 9 assumes the locked position VP and stops and/or blocks the rotary catch 7 until the next opening process O1, O2. The pre-latching position P2.2 can be achieved by manually slamming the movable vehicle element 3 or by completely automatic, i.e., motorized, adjustment of the movable vehicle element 3. In the pre-latching position P2.2, the locking element 6 is partly arranged in the receptacle 7.1 of the rotary catch 7. The rotary catch 7 is pre-latched on the blocking element 8. In particular, the rotary catch 7 is in latching engagement R with the counter latching element 8.2 of the blocking element 8.

For example, the rotary catch 7 comprises two latching elements 7.2. The rotary catch 7 comprises, for example, a latching element 7.2 designed as a pre-latching element 7.2" and another latching element 7.2 designed as a main latching element 7.2'. The pre-latching element 7.2" is in latching engagement R with the counter latching element 8.2 of the blocking element 8 in the pre-latching position P2.2. The pre-latching element 7.2" is an optionally additional latching element 7.2. In an alternative embodiment of the locking device 1, said device comprises only one latching element 7.2, for example the main latching element 7.2'. The main latching element 7.2' is in latching engagement R with the counter latching element 8.2 of the blocking element 8 in the main latching position P2.1. To adjust the locking device 1 from the open position P3 into the closed position P1, the rotary catch 7 in the embodiment shown can be pivoted counterclockwise about the associated axis of rotation Da3 and the actuating element 9 can be pivoted clockwise about the associated axis of rotation Da2. To adjust the locking device 1 from the closed position P1 into the open position P3, the rotary catch 7 in the embodiment shown can be pivoted clockwise about the associated axis of rotation Da3 and the actuating element 9 can be pivoted counterclockwise about the associated axis of rotation Da2.

The actuating element 9 comprises an actuating contour 9.2. The actuating contour 9.2 is, for example, a contact surface which comes into contact with the abutment element 7.3 of the rotary catch 7 when the rotary catch 7 is adjusted by means of the actuating element 9. The actuating contour 9.2 is provided and designed to come into contact with an abutment contour 7.6 of the rotary catch 7 when a movement of the rotary catch 7 is initiated by means of the actuating element 9 from the pre-latching position P2.2 into the main latching position P2.1. This position is shown, for example, in FIG. 3C. The actuating contour 9.2 is designed, for example, as a catching contour. Furthermore, the actuating element 9 comprises a stop contour 9.3. The stop contour 9.3 is also, for example, a contact surface which the abutment element 7.3 abuts and/or on which said abutment element rests in the closed position P1. The stop contour 9.3 is designed, for example, to block or lock a rotation of the rotary catch 7 in the direction of the open position P3 until the next opening process O1, O2. For example, the stop contour 9.3 and a counter stop contour 7.7 of the rotary catch 7 are in latching engagement R with one another in the closed position P1. This position is shown in FIG. 3D. For example, the actuating contour 9.2 and the stop contour 9.3 are designed as a substantially continuously extending outer contour 9.4 on the actuating element 9. In a development, the outer contour 9.4 can have bulges and recesses which correspond to the recesses and bulges of an outer contour 7.8 of the rotary catch 7. The abutment element 7.3 thus comprises the abutment contour 7.6 and the counter stop contour 7.7. For example, the stop contour 7.6 and the counter stop contour 7.7 form a substantially continuously extending outer contour 7.8 of the abutment element 7.3.

Figure 4:
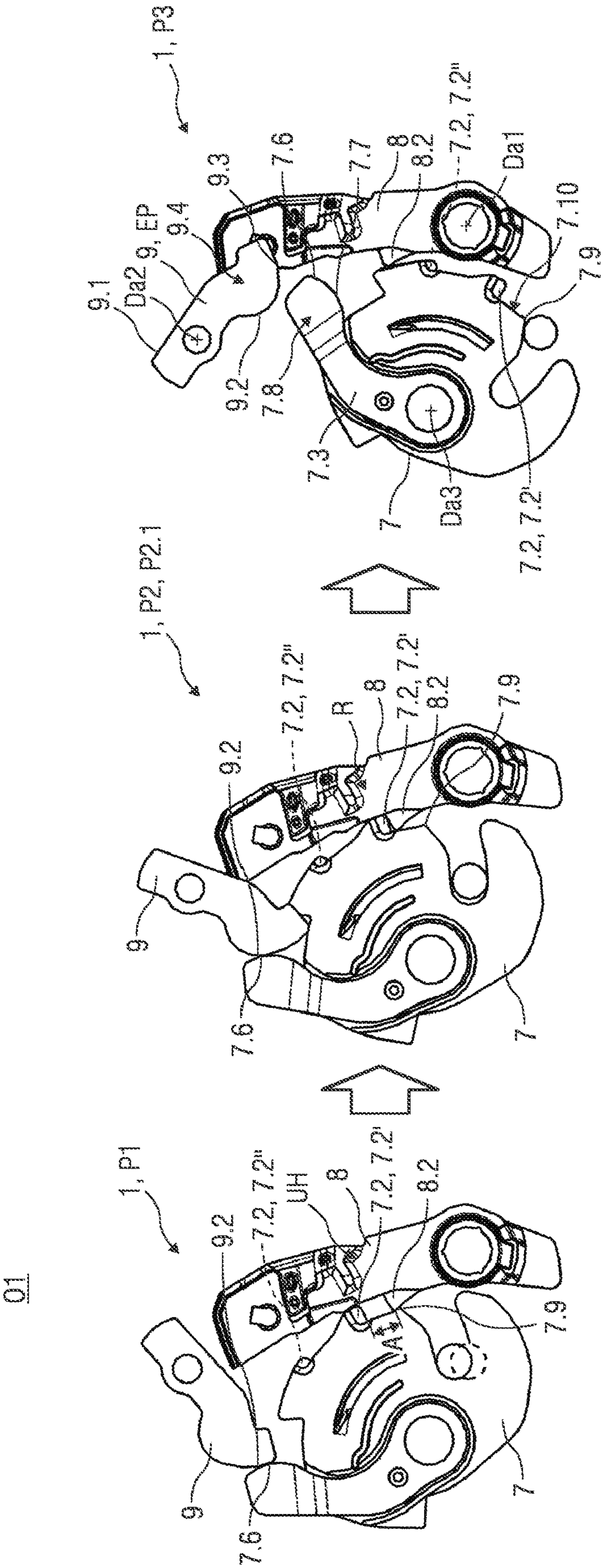

The closed position P1 of the embodiment shown corresponds to an overtravel position UH which goes beyond the main latching position P2.1 and in which the main latching element 7.2' is spaced apart from the counter latching element 8.2. In particular, an overtravel distance A between the main latching element 7.2' and the counter latching element 8.2 is largely preset. This means that the blocking element 8 and the rotary catch 7 are out of latching engagement R in the closed position P1. The actuating element 9 is designed to adjust the rotary catch 7 into a defined overtravel with respect to the main latching position P2.1 and then to stop, block and/or latch said rotary catch in a predetermined overtravel position UH. As a result, there can be a comparatively long reversing path of the rotary catch 7 during an opening process O1, O2 without comparatively high friction and sealing forces occurring between the rotary catch 7 and the blocking element 8 that have to be overcome during an opening process O1, O2. When an opening process O1, for example shown in FIG. 4, is initiated, the rotary catch 7 is reversed in a controlled manner by means of the actuating element 9. The actuating element 9 is adjusted counterclockwise, as a result of which the rotary catch 7 is moved in a defined manner from the closed position P1 back into the main latching position P2.1. For example, the actuating element 9 can be designed to adjust and guide the rotary catch 7 on the abutment element 7.3 from the closed position P1 into the main latching position P2.1 and optionally additionally into the pre-latching position P2.2 in a defined manner. Alternatively or additionally, the actuating element 9 travels continuously from the locked position VP into the unlocked position EP. When the rotary catch 7 falls into the main latching position P2.1 or pre-latching position P2.2, i.e., after being released by the actuating element 9, the blocking element 8 can be pivoted, for example, about the associated axis of rotation Da1 in order to release the rotary catch 7 to assume the open position P3. For example, the rotary catch 7 is pretensioned in the direction of the open position P3 by means of at least one spring element (not shown in detail).

In a development, the rotary catch 7 comprises, for example, an end abutment 7.9. The end abutment 7.9 is designed, for example, as a latching lug. In the plan view, the end abutment 7.9 is arranged below the main latching element 7.2' and is spaced apart from it. In the closed position P1, the end abutment 7.9 and an underside of the counter latching element 8.2 come into contact. The counter latching element 8.2 is supported on the end abutment 7.9 in the closed position P1. A guide contour 7.10 is also formed between the end abutment 7.9 and the main latching element 7.2', on which guide contour the counter latching element 8.2 can be guided in a defined manner both during the closing process and during the opening process O1, O2.

The end abutment 7.9 projects from the guide contour 7.10, for example at the end of the guide contour 7.10, in the direction of the blocking element 8. The end abutment 7.9 which is designed as a projecting latching lug is provided, for example, with a damping element and/or a damping coating. In the closed position P1, the blocking element 8 and the rotary catch 7 are in latching engagement.

The overtravel distance A described above can be predetermined or is predetermined by a distance between the end abutment 7.9 and the main latching element 7.2'. In the closed position P1, in particular the overtravel position UH, the end abutment 7.9 and the blocking element 8, in particular the counter latching element 8.2 thereof, are in latching engagement. When the end abutment 7.9 is in contact with the counter latching element 8.2, the main latching element 7.2' is arranged at a maximum overtravel distance A from the counter latching element 8.2.

In a development, a control unit (not shown in detail) is provided that is coupled to the locking device 1. The abutment of the end abutment 7.9 on the counter latching element 8.2 is detected by the control unit as a signal and control, in particular rotation, of the blocking element 8 is stopped.

In contrast to conventional systems, the locking device 1 is designed such that the sealing pressure is only applied after the main latching position P2.1, in particular what is referred to as the main latch, has been reached. This means that, in the actual main latching position P2.1, the locking device 1, i.e., the entire system, is stress-free. Only in the closed position P1 of the rotary catch 7, in particular a driving position, having the overtravel, there is counter pressure. During the opening process O1, O2, the rotary catch 7 can be guided in a defined manner by means of the blocking mechanism (Sm), in particular what is referred to as a shutting mechanism, during its actual reversing from the closed position P1 into the main latching position P2.1. Only then can the blocking pawl 8 be unlocked. This process can also take place at the same time as reversing is started. As a result, there is not a point in time during the opening process O1, O2 when there is a sudden release of a sealing force and an opening bang is thus prevented.

FIG. 4 schematically shows an opening process O1 of the locking device 1, which is moved from a closed position P1 via a main latching position P2.1 into an open position P3. For example, the actuating element 9 is moved out of the locked position VP in the direction of the unlocked position EP, for example adjusted by a motor. The rotary catch 7 moves in contact with the actuating element 9 in a defined manner from the closed position P1 into the latching position P2, in particular the main latching position P2.1. After reaching the main latching position P2.1, the blocking element 8 is outwardly pivoted about the axis of rotation Da1, i.e., away from the rotary catch 7. A further movement of the rotary catch 7 is now released and the rotary catch 7 is pivoted, for example spring-loaded, into the open position P3.

Figure 5:
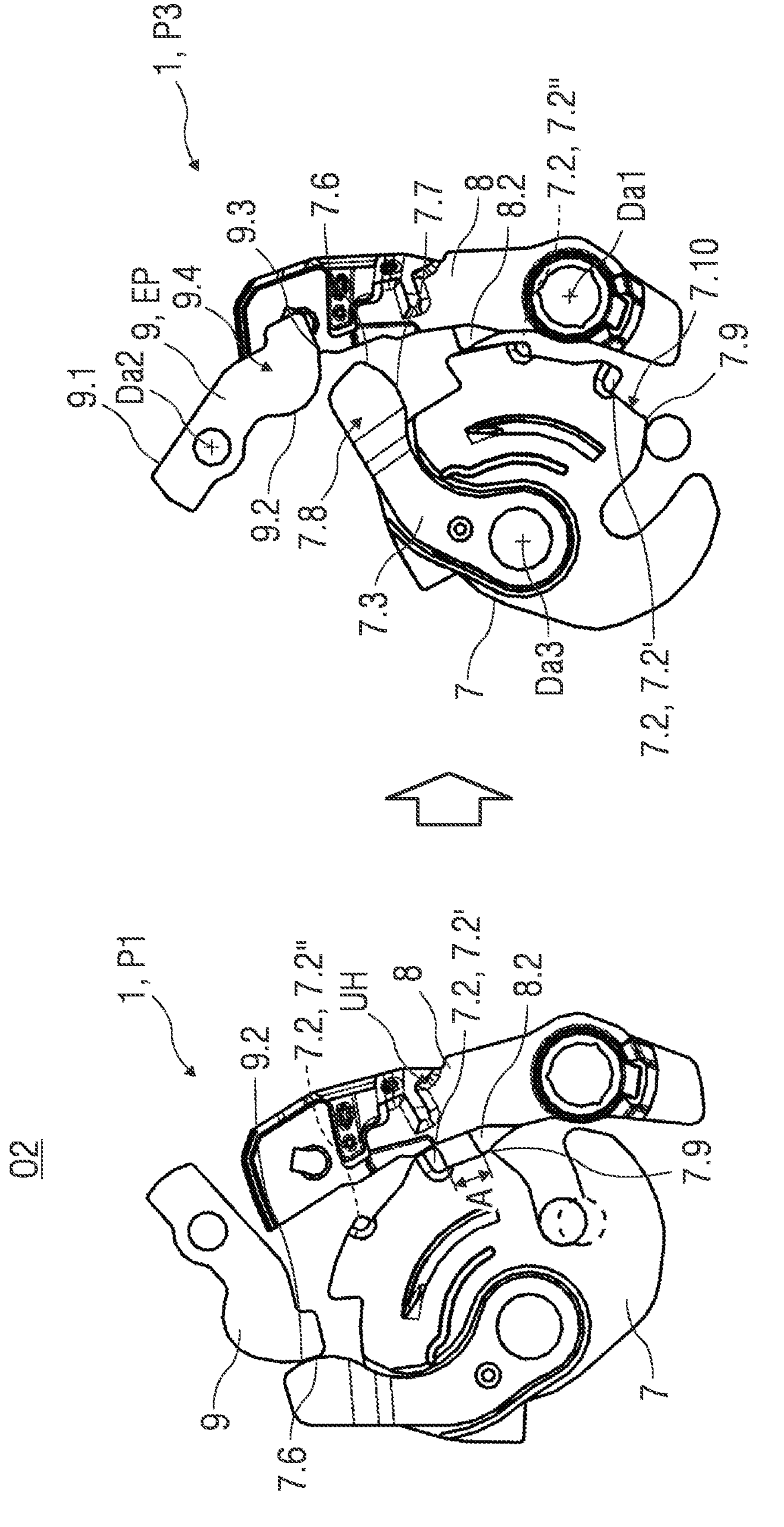

FIG. 5 schematically shows a further opening process O2 of the locking device 1 which is moved from a closed position P1 directly into an open position P3. For example, the actuating element 9 is moved out of the locked position VP in the direction of the unlocked position EP, for example adjusted by a motor. In addition, the blocking element 8 is pivoted outwardly about the axis of rotation Da1, i.e., away from the rotary catch 7, without the rotary catch 7 assuming a latching position P2, for example a main latching position P2.1 and/or pre-latching position P2.2, as in a closing process.

LIST OF REFERENCE SIGNS

- 1 Locking device
- 2 Housing
- 2.1 to 2.3 Housing part
- 3 Vehicle element
- 4 Vehicle
- 5 Ratchet
- 6 Locking element
- 7 Rotary catch
- 7.1 Receptacle
- 7.2 Latching element
- 7.2' Main latching element
- 7.2" Pre-latching element
- 7.3 Abutment element
- 7.4 Base body
- 7.5 Portion
- 7.6 Abutment contour
- 7.7 Counter stop contour
- 7.8 Outer contour
- 7.9 End abutment
- 7.10 Guide contour
- 8 Blocking element
- 8.1 Portion
- 8.2 Counter latching element
- 8.3 Portion
- 9 Actuating element
- 9.1 Portion
- 9.2 Actuating contour
- 9.3 Stop contour
- 9.4 Outer contour
- 10 Gear element
- A Overtravel distance
- Da1 to Da3 Axis of rotation
- EP Unlocked position
- O1, O2 Opening process
- P1 Closed position
- P2 Latching position
- P2.1 Main latching position
- P2.2 Pre-latching position
- P3 Open position
- P4 Main latching and closed position
- P5, P6 Position
- R Latching engagement
- UH Overtravel position
- VP Locked position
- W Adjustment path
- Sm Blocking mechanism
- Zm Shutting mechanism
- x Longitudinal axis
- y Transverse axis
- z Vertical axis

The invention claimed is:

1. A locking device for a movable vehicle element of a vehicle, comprising:

a rotary catch, a locking element and an associated blocking mechanism having at least one blocking element and a movable actuating element for locked coupling of the rotary catch and the locking element, wherein the movable actuating element is designed to move the rotary catch from a pre-latching position, in which the rotary catch is coupled in a closing manner to the locking element and is in latching engagement with the blocking element, and where the actuating element overlaps the blocking element and wherein the actuating element is out of contact and arranged distant from the rotary catch, into a main latching position and subsequently into a final closed position going beyond the main latching position and wherein the movable actuating element is designed to stop the rotary catch in this final closed position and to block or lock the rotary catch in this final closed position until an opening process, wherein the rotary catch and the blocking element are out of latching engagement in the final closed position.

2. The locking device according to claim 1, wherein the actuating element has at least one actuating contour for initiating a movement of the rotary catch from the at least one latching position into the closed position.

3. The locking device according to claim 1, wherein the actuating element has at least one stop contour for stopping the rotary catch in the closed position until an opening process.

4. The locking device according to claim 1, wherein the actuating element is designed to be pivotable about an axis of rotation between the open position and the closed position.

5. The locking device according to claim 1, wherein the rotary catch comprises at least one latching element corresponding to a counter latching element of the blocking element and at least one abutment element which is arranged on an opposite side to the latching element and can be actuated by the actuating element in order to adjust the rotary catch from the at least one latching position into the closed position.

6. The locking device according to claim 2, wherein the rotary catch has at least one abutment contour which, when actuated by the actuating element, comes into contact with the actuating contour thereof.

7. The locking device according to claim 1, wherein the rotary catch has at least one counter stop contour which is stopped on the actuating element in the closed position.

8. The locking device according to claim 1, wherein the closed position defines an overtravel position which goes beyond the latching position and in which a latching element of the rotary catch is spaced apart from a counter latching element of the blocking element.

9. The locking device according to claim 1, wherein the rotary catch comprises an end abutment on which the blocking element is supported in the closed position.

10. The locking device according to claim 9, wherein in the closed position, an overtravel distance between the rotary catch and the blocking element is predetermined by a distance between the end abutment and a latching element of the rotary catch.

11. The locking device according to claim 9, wherein the end abutment is designed as a projecting latching lug.

12. The locking device according to claim 10, wherein the rotary catch has a guide contour between the end abutment and the latching element of the rotary catch.

13. The locking device according to claim 12, wherein the blocking element is guided in a defined manner on the guide contour during a locking process and/or opening process.

* * * * *